United States Patent
Hwang et al.

(10) Patent No.: US 11,805,396 B2
(45) Date of Patent: Oct. 31, 2023

(54) COHERENT SUMMATION IN WIRELESS SENSOR PLATFORMS

(71) Applicant: Analog Devices, Inc., Norwood, MA (US)

(72) Inventors: Eugene Oh Hwang, Melrose, MA (US); Tao Yu, Cambridge, MA (US); Phillip Nadeau, Cambridge, MA (US); Michael Judy, Ipswich, MA (US); Rui Zhang, Southborough, MA (US)

(73) Assignee: Analog Devices, Inc., Wilmington, MA (US)

( * ) Notice: Subject to any disclaimer, the term of this patent is extended or adjusted under 35 U.S.C. 154(b) by 141 days.

(21) Appl. No.: 16/831,741

(22) Filed: Mar. 26, 2020

(65) Prior Publication Data

US 2020/0314607 A1 Oct. 1, 2020

Related U.S. Application Data

(60) Provisional application No. 62/824,397, filed on Mar. 27, 2019.

(51) Int. Cl.
*H04W 24/02* (2009.01)
*H04W 4/38* (2018.01)
*H04W 24/08* (2009.01)

(52) U.S. Cl.
CPC ............. *H04W 4/38* (2018.02); *H04W 24/02* (2013.01); *H04W 24/08* (2013.01)

(58) Field of Classification Search
CPC ....... H04W 4/38; H04W 24/08; H04W 24/02; H04W 24/06; H04W 84/18
See application file for complete search history.

(56) References Cited

U.S. PATENT DOCUMENTS

| 4,028,697 A | 6/1977 | Albanese et al. |
| 5,517,115 A | 5/1996 | Prammer |

(Continued)

FOREIGN PATENT DOCUMENTS

| CA | 2127282 C | 5/2004 |
| CA | 2486551 C | 1/2012 |

(Continued)

OTHER PUBLICATIONS

Ali et al., Exploiting Spatial Proximity for Detection in Wireless Sensor Network. Iranian Journal of Science and Technology, Transactions of Electrical Engineering. Sep. 10, 2019; 12 pages.

(Continued)

*Primary Examiner* — Hassan Kizou
*Assistant Examiner* — Hector Reyes
(74) *Attorney, Agent, or Firm* — Wolf, Greenfield & Sacks, P.C.

(57) ABSTRACT

Described herein are techniques for improving the signal-to-noise ratio of a wireless sensor platform. The device that interrogates a wireless sensor node (an interrogator) may be configured to determine the quantity to be measured by extracting information from multiple echoes produced in response to multiple interrogation pulses or produced due to multi-path propagation. Although different echoes may have been transformed to different extents, the echoes may share unique characteristics that are specific to the wireless sensor node that produced them. Accordingly, the SNR may be improved by keeping only portions of the received signal that exhibit such characteristics. The SNR may be further improved by summing the echoes together. In some embodiments, the echoes may be summed together in a coherent fashion, thereby producing an echo having an amplitude greater than the amplitude of each of the received echoes.

19 Claims, 14 Drawing Sheets

(56) References Cited

U.S. PATENT DOCUMENTS

| | | |
|---|---|---|
| 6,291,994 B1 | 9/2001 | Kim et al. |
| 6,765,493 B2 | 7/2004 | Lonsdale et al. |
| 7,023,323 B1 | 4/2006 | Nysen |
| 7,065,459 B2 | 6/2006 | Kalinin et al. |
| 7,099,367 B2 | 8/2006 | Richards et al. |
| 7,352,468 B2 | 4/2008 | Tarsa |
| 7,394,251 B2 | 7/2008 | Lin |
| 7,786,864 B1 | 8/2010 | Shostak et al. |
| 8,102,952 B2 | 1/2012 | Sung et al. |
| 8,134,990 B2 | 3/2012 | Kangas et al. |
| 8,143,890 B2 | 3/2012 | Dong et al. |
| 8,232,799 B2 | 7/2012 | Hajian et al. |
| 8,296,087 B2 | 10/2012 | Kalinin et al. |
| 8,436,512 B2 | 5/2013 | Droit et al. |
| 8,490,489 B2 | 7/2013 | Randall et al. |
| 8,704,522 B2 | 4/2014 | Akita et al. |
| 8,737,911 B2 | 5/2014 | Black et al. |
| 9,008,216 B2 | 4/2015 | Garmany |
| 9,035,774 B2 * | 5/2015 | Scott .................. G01S 13/9004 340/572.1 |
| 9,574,966 B2 | 2/2017 | Huang et al. |
| 10,075,961 B2 | 9/2018 | Nekovee |
| 10,079,703 B1 * | 9/2018 | Su ........................ H04L 1/0009 |
| 10,418,965 B2 * | 9/2019 | Feng ........................ G01S 5/02 |
| 2001/0043650 A1 * | 11/2001 | Sommer ................ H04N 5/211 375/232 |
| 2002/0064246 A1 * | 5/2002 | Kelkar ...................... H04L 1/06 375/347 |
| 2002/0181633 A1 | 12/2002 | Trans |
| 2004/0127184 A1 * | 7/2004 | Kao ..................... H04B 7/0837 455/272 |
| 2007/0058703 A1 * | 3/2007 | Behzad ............... H03F 3/45188 375/219 |
| 2007/0107519 A1 * | 5/2007 | Liu ..................... G01P 15/0975 73/649 |
| 2008/0112265 A1 | 5/2008 | Urbano et al. |
| 2009/0153319 A1 * | 6/2009 | Duran .................. G06K 7/0008 340/505 |
| 2009/0224629 A1 * | 9/2009 | Jinno ................. G01C 19/5698 310/313 B |
| 2010/0052865 A1 | 3/2010 | Eckstein |
| 2010/0095740 A1 * | 4/2010 | Walton ............... G01N 29/4481 73/64.53 |
| 2010/0127834 A1 * | 5/2010 | Cobianu ............ G06K 19/0672 340/10.1 |
| 2015/0230105 A1 * | 8/2015 | Negus ............... H04W 72/0406 370/329 |
| 2015/0312654 A1 | 10/2015 | Lee et al. |
| 2017/0331460 A1 * | 11/2017 | Rokhsaz ............. H01Q 1/2225 |
| 2018/0017652 A1 | 1/2018 | Ye |
| 2018/0069576 A1 * | 3/2018 | Dark ..................... H04L 7/0087 |
| 2020/0007540 A1 * | 1/2020 | Kawaguchi ............. G01K 7/22 |

FOREIGN PATENT DOCUMENTS

| | | |
|---|---|---|
| CN | 104316761 A | 1/2015 |
| CN | 109787930 A | 5/2019 |
| DE | 10 2015 106589 A1 | 10/2015 |
| EP | 1 196 863 A1 | 4/2002 |
| EP | 3 025 466 B1 | 1/2019 |
| GB | 2 411 239 A | 8/2005 |
| JP | 2008-263627 A | 10/2008 |
| JP | 2012-074824 A | 4/2012 |
| JP | 2019-518202 A | 6/2019 |
| KR | 20010090039 A | 10/2001 |
| KR | 20100052263 A | 5/2010 |
| KR | 10-1959938 B1 | 3/2019 |
| WO | WO 01/02993 A1 | 1/2001 |
| WO | WO 2008/037547 A2 | 4/2008 |
| WO | WO 2016/119686 A2 | 8/2016 |
| WO | WO 2017/180698 A1 | 10/2017 |

OTHER PUBLICATIONS

Lurz et al., Reader Architectures for Wireless Surface Acoustic Waves Sensors. Sensors. 2018; 18(1734): 29 pages.

Reindl et al., Theory and Application on Passive SAW Radio Transponders as Sensors. IEEE Transactions on Ultrasonics, Ferroelectrics. And Frequency Control. Sep. 1998:45(5):1281-1292.

* cited by examiner

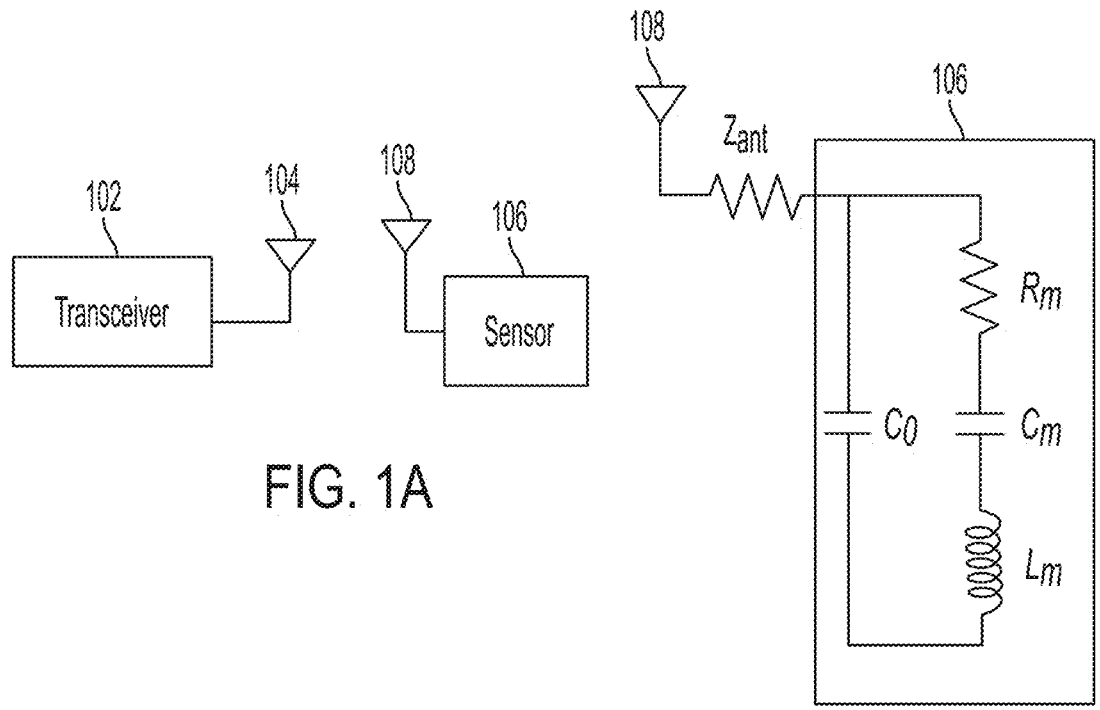
FIG. 1A
FIG. 1B
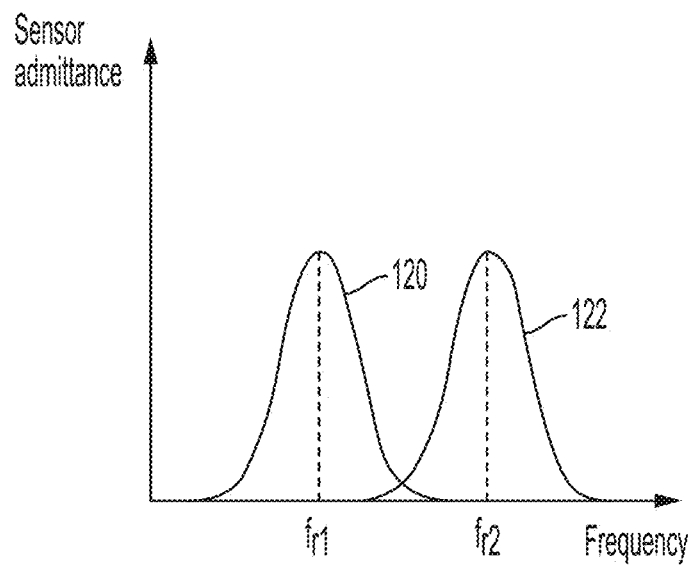
FIG. 1C

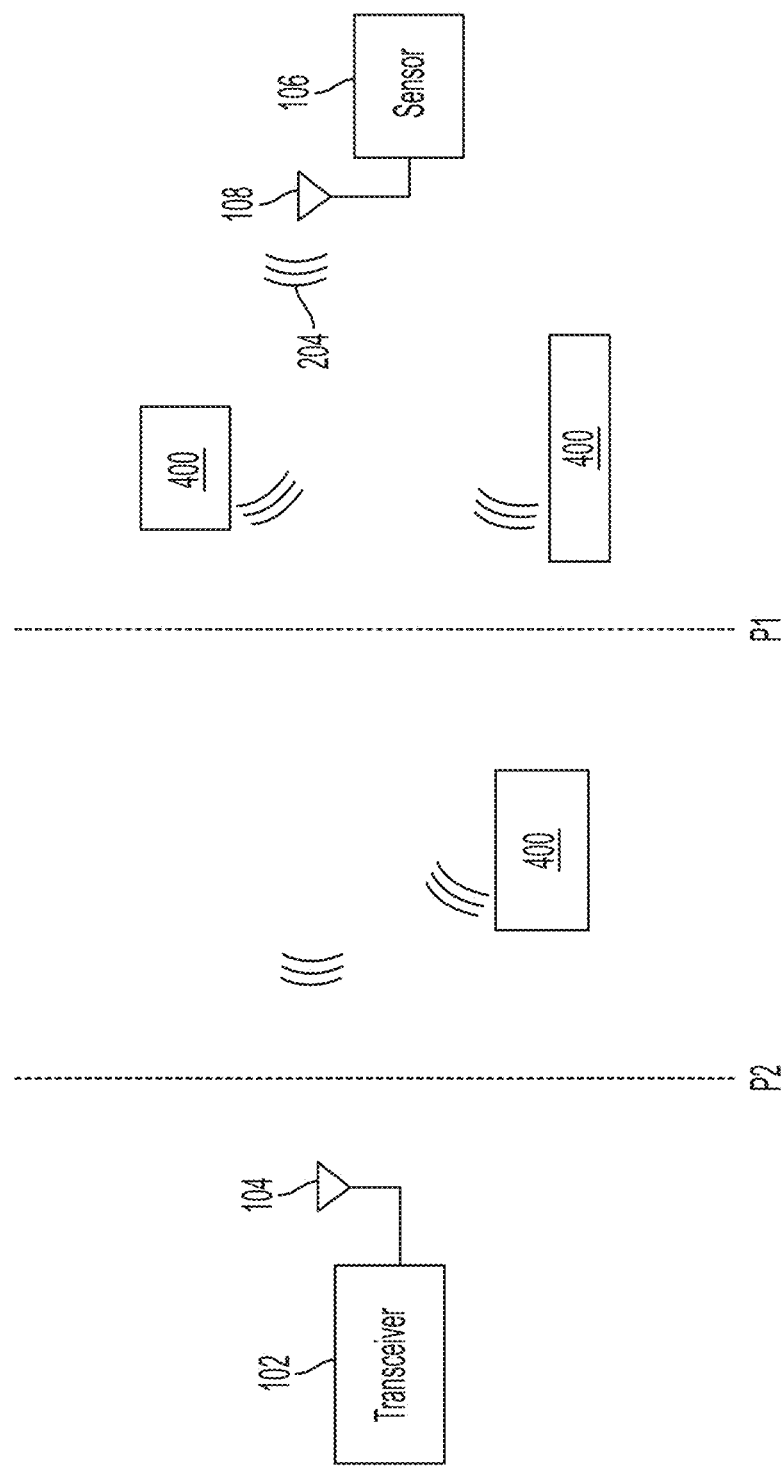

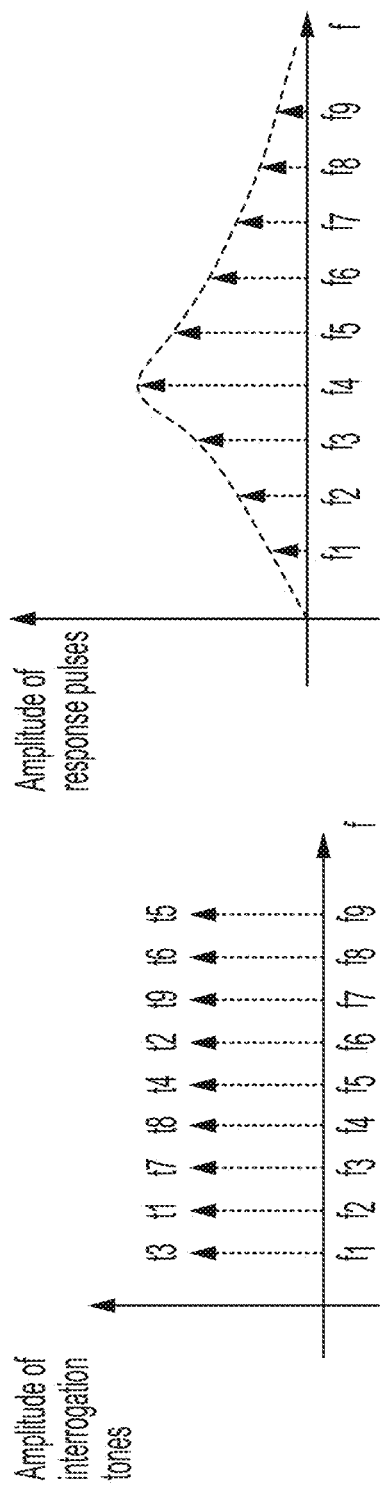

COHERENT SUMMATION IN WIRELESS SENSOR PLATFORMS

CROSS-REFERENCE TO RELATED APPLICATIONS

This application claims the benefit under 35 U.S.C. § 119(e) of U.S. Provisional Application Ser. No. 62/824,397, entitled "CALIBRATION AND POST-PROCESSING METHODS FOR HIGH-Q RESONATOR-BASED PASSIVE WIRELESS SENSOR PLATFORM," filed on Mar. 27, 2019, which is hereby incorporated herein by reference in its entirety.

FIELD OF THE DISCLOSURE

The technology described in the present application relates to resonant passive wireless sensors.

BACKGROUND

Wireless sensor nodes are often deployed at remote locations to monitor environmental or physical conditions, such as temperature or pressure. Some wireless sensor nodes are equipped with wireless transceivers for transmitting measurement data to a base station.

SUMMARY OF THE DISCLOSURE

Some embodiments relate to techniques for improving the signal-to-noise ratio of a wireless sensor platform. The device that interrogates a wireless sensor node (an interrogator) may be configured to determine the quantity to be measured by extracting information from multiple echoes produced in response to multiple interrogation pulses or produced due to multi-path propagation. Although different echoes may have been transformed to different extents, the echoes may share unique characteristics that are specific to the wireless sensor node that produced them. Accordingly, the SNR may be improved by keeping only portions of the received signal that exhibit such characteristics. The SNR may be further improved by summing the echoes together. In some embodiments, the echoes may be summed together in a coherent fashion, thereby producing an echo having an amplitude greater than the amplitude of each of the received echoes.

Some embodiments relate to method for controlling a sensor node. The method comprises transmitting at least one interrogation signal to the sensor node; receiving, in response to the transmitting, a response signal from the sensor node; conditioning the response signal to obtain a plurality of echoes, wherein the conditioning comprises identifying a plurality of portions of the response signal as exhibiting a predefined signal characteristic; and summing the plurality of echoes together coherently to obtain a coherent response signal.

Some embodiments relate to an interrogator wirelessly coupled with a sensor node. The interrogator comprises a transmitter configured to transmit at least one interrogation signal to the sensor node; and a receiver. The receiver is configured to receive, in response to the transmitting, a response signal from the sensor node; condition the response signal to obtain a plurality of echoes, wherein the conditioning comprises identifying a plurality of portions of the response signal as exhibiting a predefined signal characteristic; and sum the plurality of echoes together coherently to obtain a coherent response signal.

Some embodiments relate to an interrogator wirelessly coupled with a sensor node. The interrogator comprises an antenna; a transmitter coupled to the antenna and comprising a local oscillator, and transmit circuitry configured to transmit, through the antenna, at least one interrogation signal based on an output of the local oscillator. The interrogator further comprises a receiver coupled to the antenna and configured to receive, subsequent to the transmitting, a response signal from the sensor node; obtain a plurality of echoes by identifying a plurality of portions of the response signal as exhibiting a predefined envelope; sum the plurality of echoes together coherently to obtain a coherent response signal; and determine an environmental or physical condition using the coherent response signal.

BRIEF DESCRIPTION OF THE DRAWINGS

Various aspects and embodiments of the disclosure are described with reference to the following figures. The figures are not necessarily drawn to scale. Items appearing in multiple figures are indicated by the same reference number in all the figures in which they appear.

FIG. 1A is a block diagram illustrating a transceiver and a sensor, in accordance with some embodiments.

FIG. 1B is a circuit diagram illustrating the equivalent circuit of a sensor, in accordance with some embodiments.

FIG. 1C is a plot illustrating the admittance of a sensor as a function of frequency, in accordance with some embodiments.

FIG. 4A is a diagram illustrating generation of multiple echoes, in accordance with some embodiments.

FIG. 7A is a plot illustrating an example of an interrogation signal sequence, in accordance with some embodiments.

FIG. 7B is an example of a response to the interrogation signal sequence of FIG. 7A, in accordance with some embodiments.

DETAILED DESCRIPTION

I. Overview

Figure 2:
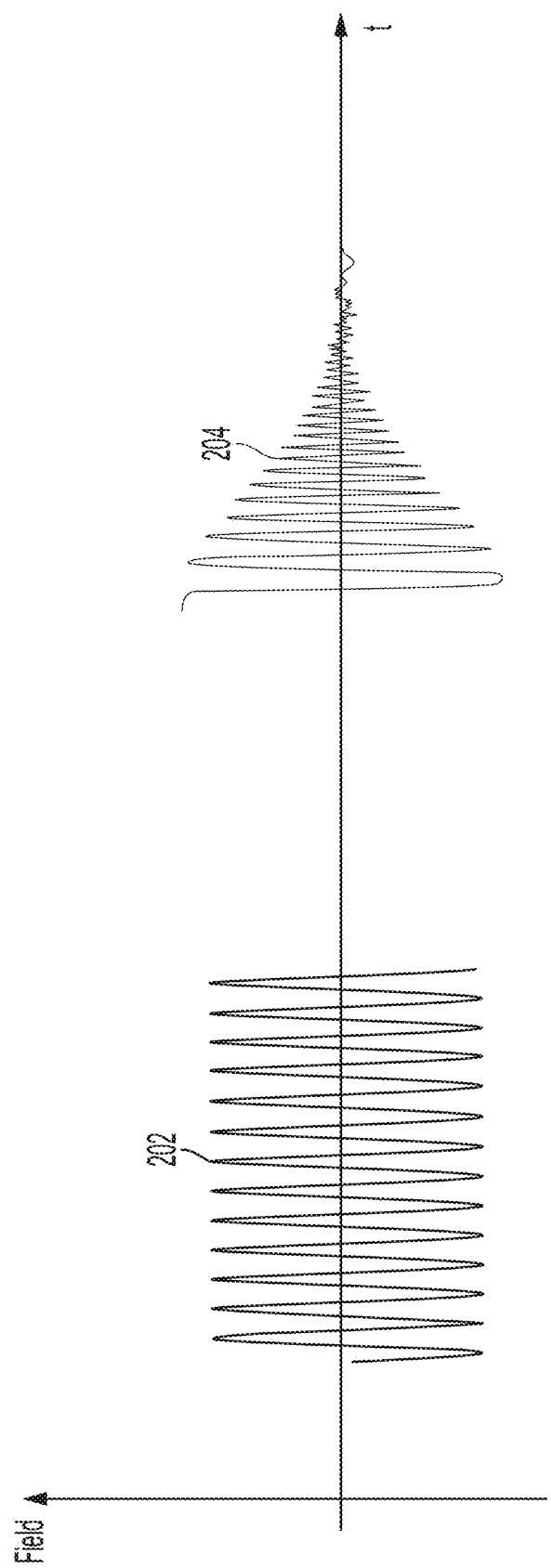
FIG. 2 is a plot illustrating an interrogation signal and a response signal, in accordance with some embodiments.

Applicant has appreciated that passive wireless sensor platforms suffer from limited reading range and accuracy due to the passive nature of sensor nodes. Aspects of the present application relate to techniques for improving the signal-to-noise ratio (SNR) of a wireless sensor platform. Improving the SNR may in turn improve the platform's ability to sense an environmental or physical condition (also referred to as "the quantity to be measured").

Applicant has appreciated that the SNR of a wireless sensor platform may be reduced by interrogating a sensor node with multiple interrogation pulses, and by combining together the echoes produced by the sensor node in response to those interrogation pulses. However, combining the echoes together may be challenging. For example, Applicant has further appreciated that each echo may experience multi-path propagation. Multi-path propagation occurs when copies of an echo are produced as the echo reflects against obstacles positioned between the wireless sensor node and the device that interrogates it (the interrogator). The primary echo—which already carries low power due to the passive nature of the sensor node—loses additional power at each reflection against an obstacle. The primary echo may reach the interrogator with insufficient power to allow for an accurate reading.

The presence of noise makes things even worse. In addition to receiving the response of the sensor node, the interrogator may capture spurious signals transmitted by nearby antennas, thus further reducing the SNR. The effect of noise is particularly serious for wireless sensor nodes operating in the 2.4 GHz-2.5 GHz frequency range, the frequency band of WiFi and Bluetooth® devices.

Aspects of the present application relate to techniques for overcoming these problems. In some embodiments, an interrogator may be configured to determine the quantity to be measured by extracting information not only from one echo, but from multiple echoes. Applicant has appreciated that, although different echoes may have been transformed to different extents before reaching the interrogator, the echoes may share unique characteristics that are specific to the wireless sensor node that produced them. Because the spurious signal are not produced by the wireless sensor node, these signals do not exhibit the same characteristics. Accordingly, in some embodiments, the SNR may be improved by keeping portions of the received signal that exhibit such characteristics, and by discarding portions of the received signal that do not exhibit such characteristics.

Aspects of the present application leverage the presence of multiple echoes for improving the SNR of a wireless sensor platform. Whether multiple echoes are produced in response to receiving multiple interrogation pulses or whether multiple echoes are produced in response to one interrogation pulse in the presence of multi-path propagation, the SNR may be further improved by summing the echoes together. Summing the echoes together, however, is not straightforward. The echoes may reach the interrogator at different times and with different phases, for example because they were produced at different times and/or because they traveled different paths before reaching the interrogator. Accordingly, summing the echoes directly may result in a distorted version of an echo, from which it would be difficult to determine any meaningful information about the quantity to be measured. In some embodiments, this can be obviated by summing the echoes together in a coherent fashion. In some embodiments, a coherent summation may involve time delaying the echoes so that the echoes overlap in time, and summing the delayed echoes together. In some embodiments, a coherent summation may involve phase shifting the echoes so that the echoes have matching phases, and summing the phase shifted echoes together. In some embodiments, a coherent summation may involve both time delaying and phase shifting.

II. Wireless Sensor Platforms

FIG. 1A depicts a wireless sensor platform including a transceiver 102 (also referred to herein as the "interrogator") and a sensor 106 (also referred to as the "sensor node"). The transceiver 102 is in communication with the sensor 106 wirelessly. The transceiver 102 is coupled to at least one antenna 104 and the sensor 106 is coupled to at least one antenna 108. Antennas 104 and 108 are in wireless communication with one another. In some embodiments, antenna 104 serves as both the transmit antenna and the receive antenna. In other embodiments, an antenna 104 serves as the transmit antenna, and another, separate antenna 104 serves as the receive antenna. Similarly, antenna 108 may serve as both the transmit antenna and the receive antenna, or alternatively, there may a transmit antenna 108, and a separate, receive antenna 108.

The sensor 106 may be placed at a remote location for sensing a quantity, including an environmental condition, such as temperature, pressure, acoustic intensity, ultrasound intensity, light intensity, infrared intensity, carbon dioxide concentration, nitrogen oxide concentration, pH, liquid or air flow, air speed and/or depth, among other environmental conditions, and/or a physical condition, such as the acceleration, speed, position and/or rate or rotation of a body, a heart rate or other medical conditions associated with a patent, among other physical conditions.

In some embodiments, the sensor 106 may be passive (e.g., without batteries or other power supplies), though in some such passive sensors, energy harvesters may be provided. Examples of energy harvesters include kinetic energy harvesters (e.g., from mechanical vibrations), thermal energy harvesters (e.g., from a temperature gradient), photovoltaic energy harvesters, and/or radio frequency energy harvesters. In some embodiments, sensor 106 is designed to harvest electromagnetic radiation collected with antenna 108. For example, sensor 106 may harvest energy from the same signal that interrogates the sensor.

In some embodiments, sensor 106 comprises a resonant sensor. For example, sensor 106 may comprise a surface acoustic wave (SAW) sensor. FIG. 1B depicts the equivalent circuit model of a representative resonant sensor according to some embodiments. In this example, the sensor 106 comprises a resistor $R_m$, capacitors $C_m$ and $C_o$, and an inductor $L_m$. Resistor $R_m$, capacitor $C_m$ and inductor $L_m$ are placed in series with each other, and the series in placed in parallel with capacitor Co. Resistor $R_{ant}$ represents the input impedance of antenna 108. As shown in FIG. 1B, the sensor 106 is arranged to form a resonator (an LC resonator in this case, though other types of resonators are also possible). The quantity to be measured (e.g., temperature) may affect the capacitance of capacitor $C_m$, the inductance of inductor $L_m$, the resistance of resistor $R_m$ and/or the capacitance of capacitor $C_o$. When any one of these parameters varies in response to variations in the quantity to be measured, the resonant frequency and/or the amplitude of the sensor varies. Accordingly, sensing of the quantity can be performed by sensing the resonant frequency of the sensor. FIG. 1C is a plot illustrating the input admittance of sensor 106, as seen from antenna 108, as a function of frequency. Responses 120 and 122 represent the input admittance of sensor 106 at a first value and a second, respectively, of a certain environmental or physical condition. For example, response 120 may represent the admittance at temperature $T_1$ and response 122 may represent the admittance at temperature $T_2$, with $T_1$ being different than $T_2$. Frequency $f_{r1}$ indicates the resonant frequency of response 120 and frequency $f_{r2}$ indicates the resonant frequency of response 122. In some embodiments, the environmental or physical quantity of interest may be quantified by identifying the resonant frequency of sensor 106. Thus, in some embodiments, transceiver 102 may interrogate sensor 106 to determine the resonant frequency of the sensor.

In some embodiments, the environmental or physical quantity of interest may be quantified by determining the amplitude or envelope of the response of sensor 106.

Determining the quantity to be measured may involve interrogating the sensor in a wireless fashion. This may be achieved by transmitting one or more interrogation signals to sensor 106 using antenna 104. Each interrogation signal may be, for example, a sinusoidal signal, though other types of signals may be used. In response to receiving the interrogation signal(s), sensor 106 may transmit a response signal. The response signal may be a signal oscillating at the resonant frequency of the sensor. As noted above, the resonant frequency may depend on the quantity to be measured. For example, a higher temperature may lead to a higher resonant frequency, or vice versa, depending on the arrangement of the sensor's circuit. FIG. 2 is a plot illustrating the field (e.g., the electric field) of a representative interrogation signal as transmitted by antenna 104, and the field of a representative response signal as transmitted by antenna 108. Both signals are plotted as a function of time. In this example, interrogation signal includes a pulse 202 oscillating at a certain frequency, referred to herein as the interrogation frequency. The response signal includes an echo 204 oscillating at the resonant frequency of sensor 106, where the denomination "echo" indicates a pulse generated in response to reception of an interrogating pulse. Echo 204 has a decaying envelope due to the limited energy available at the sensor. The decay rate of the envelope may depend upon various factors, including for example upon the electric characteristics of sensor 106 (e.g., the resistance of resistor $R_m$). Upon receiving the pulse, transceiver 102 determines the frequency of oscillation of the echo, and determines the quantity to be measured based on that frequency.

In some embodiments, an interrogation may involve transmitting multiple interrogation signals and collecting the response signals produced by the sensor node. For example, an interrogator may transmit multiple interrogation pulses and, accordingly, the response signal may include multiple echoes.

Figure 3A:
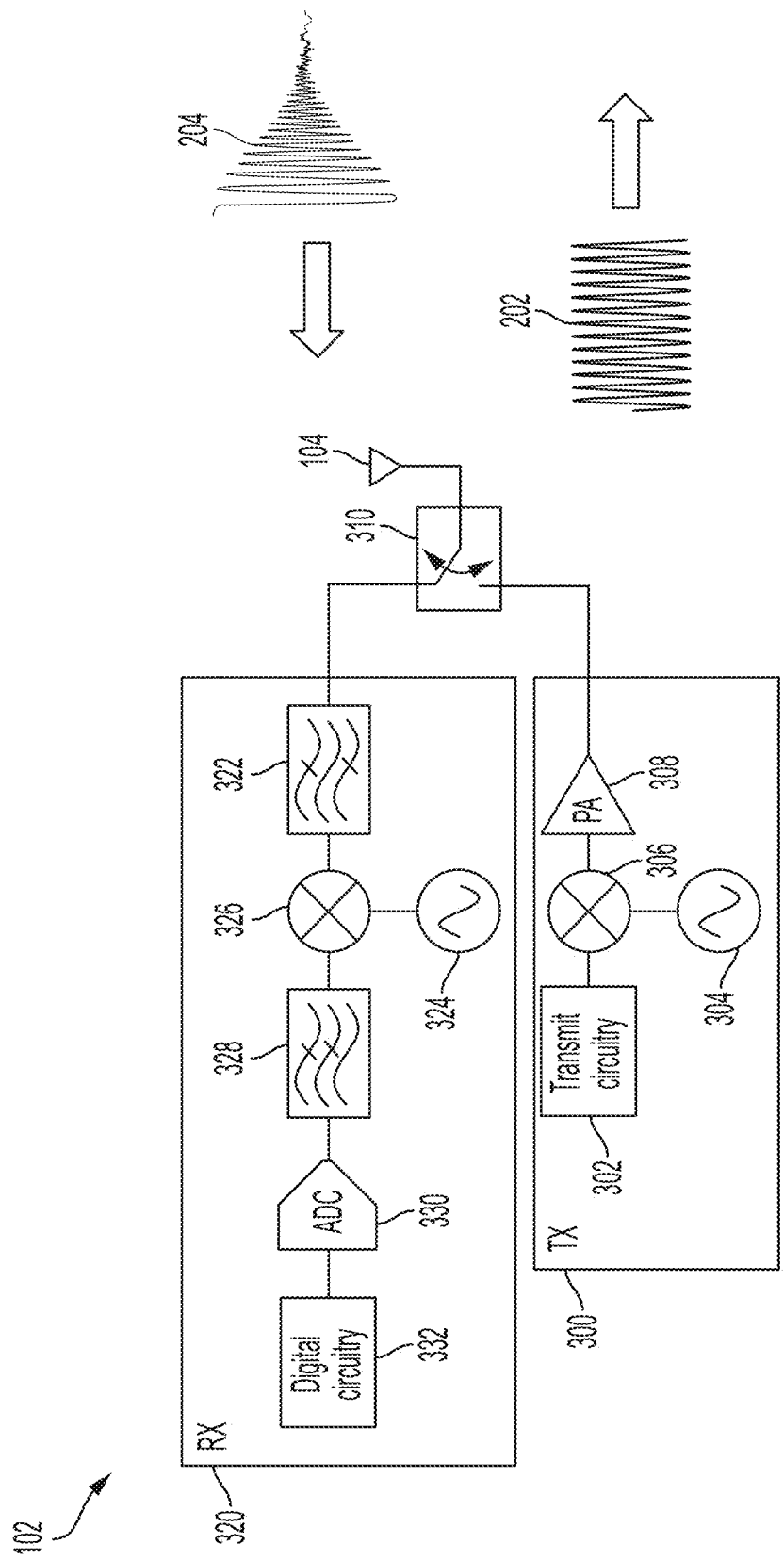
FIG. 3A is a block diagram illustrating a transceiver in additional detail, in accordance with some embodiments.

FIG. 3A is a block diagram illustrating an example of a transceiver 102, in accordance with some embodiments. In this example, the transceiver 102 includes a transmitter (TX) 300 and a receiver (RX) 320. As further illustrated in FIG. 3A, the transmitter 300 transmits an interrogation signal including a pulse 202 and the receiver 320 receives a response signal including an echo 204 from the sensor.

Transmitter 300 includes transmit circuitry 302, a local oscillator 304, a mixer 306 and a power amplifier (PA) 308. A switch 310 connects antenna 104 to either transmitter 300 or receiver 320. However, in other embodiments, transceiver 102 may include a dedicated transmit antenna and a dedicated receive antenna. Receiver 320 includes a bandpass filter 322, a local oscillator 324, a mixer 326, a low-pass filter 328, an analog-to-digital converter (ADC) 330 and digital circuitry 332.

Local oscillator 304 may be configured to output a carrier signal, such as a sinusoidal signal. In some embodiments, the output frequency of local oscillator 304 is adjustable. As a result, the frequency of the interrogation signal is also adjustable. Transmit circuitry 302 may output a signal to be modulated with the output of local oscillator 304. In some embodiments, transmit circuitry 302 generates a pulse. Mixer 306 combines the output of local oscillator 304 with the output of transmit circuitry 302. The result of the mixing may be, for example, a pulse modulated at the selected frequency of the local oscillator. PA 308 may amplify the power of the signal emerging from mixer 306. Transmitter 300 provides the modulated signal to antenna 104, which transmits it.

In response to receiving an interrogation signal, sensor 106 (not shown in FIG. 3A) transmits a response signal (e.g., echo 204). Antenna 104 receives the response signal and provides it to receiver 320 for further processing. Bandpass filter 322 filters the response signal, thereby suppressing noise outside the frequency band of interest. In some embodiments, for example, the pass-band of filter 322 is centered in the 2.4 GHz-2.5 GHz frequency range. Local oscillator 324 provides a demodulating signal that, when mixed with the response signal (using mixer 326), produces a demodulated version of the response signal. The demodulated signal may be filtered with a lowpass filter 328 to reduce noise.

Figure 3B:
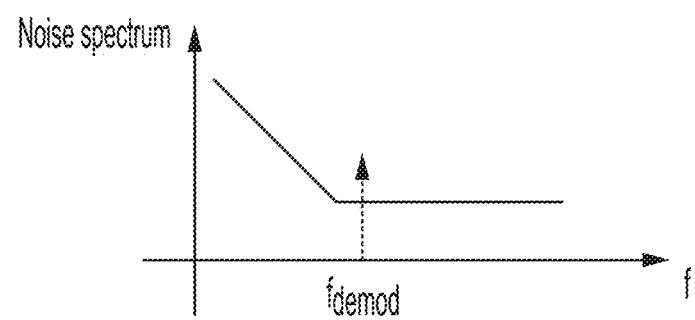
FIG. 3B is a plot illustrating the spectrum of the noise present at a receiver, in accordance with some embodiments.

FIG. 3B is a plot illustrating the spectrum of noise that may be present at the output of mixer 326 in accordance with some embodiments. At lower frequencies, the noise decreases with the frequency, meaning that 1/f noise dominates in this spectral region. At higher frequencies, the noise is substantially constant, meaning that white noise dominates in this other spectral region. The frequency $f_{demod}$ represents the frequency of the demodulated signal at the output of mixer 326. In some embodiments, the frequency of local oscillator 324 may be chosen so that the frequency $f_{demod}$ falls outside the spectral portion dominated by the 1/f noise.

Figure 3C:
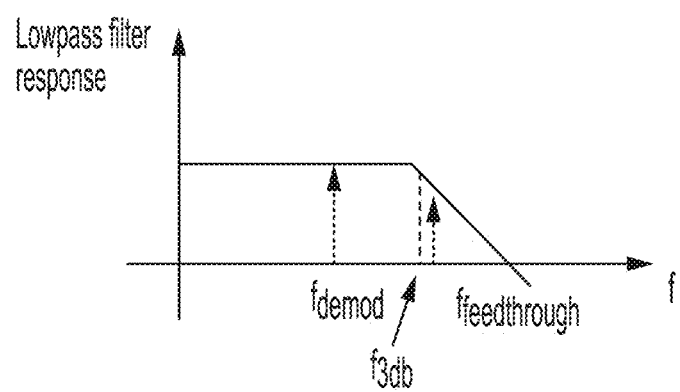
FIG. 3C is a plot illustrating the spectral response of the filter of a receiver, in accordance with some embodiments.

Referring back to FIG. 3A, in some embodiments, a portion of the output of transmitter 300 may inadvertently couple directly to receiver 320. This portion of the output of transmitter is referred to herein as "feedthrough signal." The presence of a feedthrough signal at receiver 320 is undesirable as it may interfere with the response signal received at antenna 104. To mitigate the interference, in some embodiments, filter 328 may be configured to suppress the feedthrough signal. FIG. 3C illustrates an example of spectral response of filter 328, in accordance with some embodiments. In this example, the 3 dB frequency ("$f_{3dB}$") of lowpass filter 328 is chosen to permit passage of the demodulated response signal (represented by frequency $f_{demod}$) and to suppress the feedthrough signal (represented by frequency $f_{feedthrough}$). Thus, in some embodiments, $f_{demod} < f_{3dB} < f_{feedthrough}$.

III. Coherent Summation

In some circumstances, the response signal of a sensor 106 may undergo multi-path propagation—copies of the echo are produced as a result of the echo reflecting against obstacles positioned between antennas 104 and 108, such as buildings, bodies of water, or terrestrial objects. The effect of multi-path propagation is illustrated in FIG. 4A. In this example, there are three obstacles 400 in the region between antennas 104 and 108. As it reflects against one or more of such obstacles, echo 204 may produce one or more copies. Each copy, in turn, may produce other copies. As a result, multiple echoes may reach, and by captured by, antenna 104. Depending on the path traveled to reach antenna 104, each echo may have different characteristics, such as different times of arrival, phases and amplitudes.

Figure 4B:
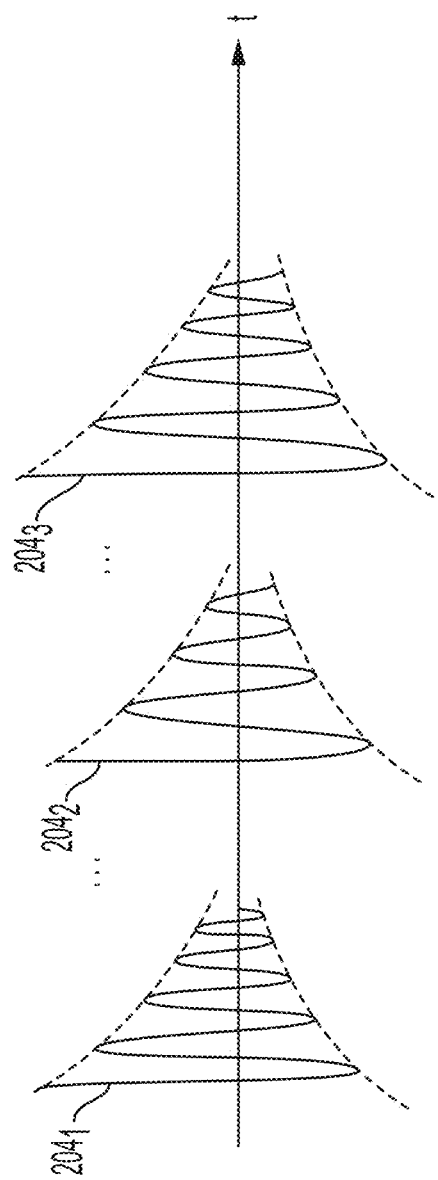
FIG. 4B is a plot illustrating a response signal including a plurality of echoes, in accordance with some embodiments.

FIG. 4B is a plot illustrating multiple echoes. These echoes may be produced as a result of receiving, with a sensor node, multiple interrogation pulses and/or as a result of multi-path propagation. FIG. 4B represents the response signal as observed at plane P1 of FIG. 4A. In this example, there are three echoes—echo 2041, echo 2042 and echo 2043—though any number of echoes may be produced. Each echo may be responsive to a different interrogation pulse. Alternatively, one of the echoes may be the primary echo (the echo actually emitted by antenna 108), the other may be secondary echoes. Echoes 2041, 2042 and 2043 are delayed relative to another because they were produced at different times and/or because they have traveled different paths before reaching plane P1. The echoes may have different phases, for example because they have traveled different distances and/or because they have undergone different phase shifts as they reflected against the obstacles. Further, the echoes may have different amplitudes, for example because they have been attenuated by different amounts before reaching plane P1. In some embodiments, however, the echoes may oscillate at the same frequency or substantially the same frequency—the resonant frequency of sensor 106.

Figure 4C:
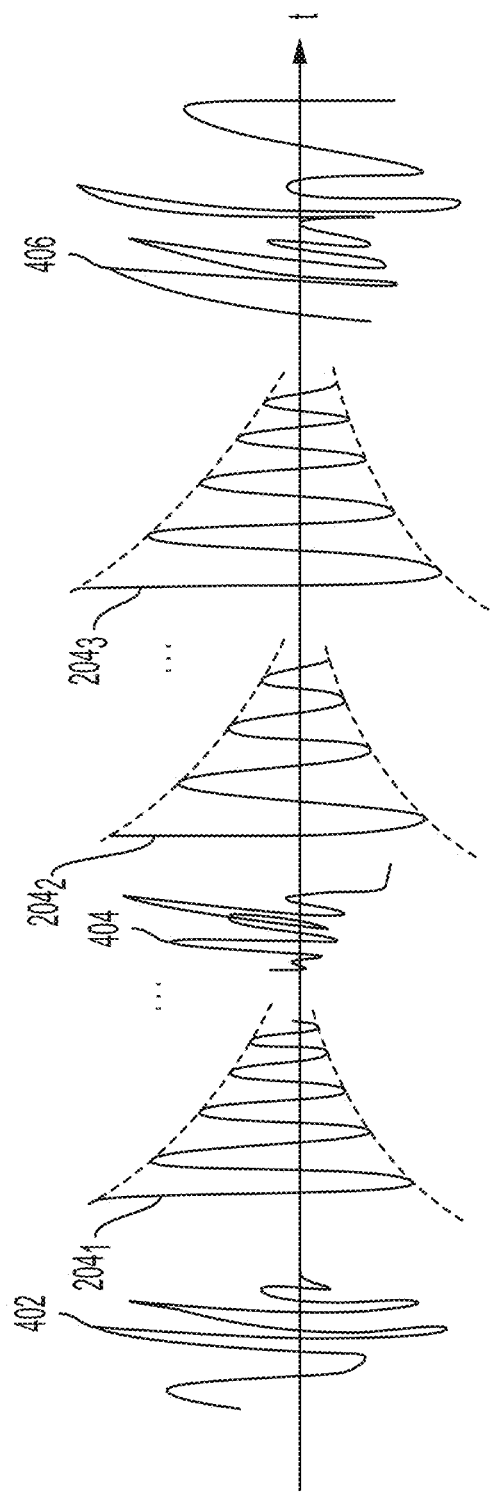
FIG. 4C is a plot illustrating the response signal of FIG. 4A in the presence of interference, in accordance with some embodiments.

FIG. 4C illustrates the response signal as observed at plane P2 of FIG. 4A, where plane P2 is between plane P1 and antenna 104. In addition to having multiple echoes, the response signal exhibits other spurious pulses (402, 404 and 406). These spurious pulses are produced by other antennas present in proximity to antenna 104 and 108. The antennas may be, for example, WiFi antennas or a Bluetooth® antennas.

In some embodiments, the spurious signals and the echoes may be in the same frequency region, such as in the 2.4 GHz-2.5 GHz frequency range (though not all embodiments are limited to this particular frequency range). As a result, frequency domain filtering may not be an effective way to suppress the spurious pulses. Yet, to increase the signal-to-noise ratio at the transceiver and improve the transceiver's ability to identify the frequency of oscillation of the echoes, it may be desirable to isolate the echoes from the spurious signals. In some embodiments, transceiver 102 may obtain the echoes (e.g., isolate the echoes from the spurious pulses or other interfering signals) by conditioning the response signal in the time domain. The time-domain signal conditioning may be performed in numerous ways.

The echoes may exhibit unique signal characteristics that are specific to sensor 106. Because the spurious pulses are not generated by sensor 106, these pulses may not exhibit these characteristics. Accordingly, in some embodiments, the conditioning comprises identifying portions of the response signal as exhibiting these particular characteristics. Examples of signal characteristics that may be considered in the conditioning include the envelope, the amplitude, the power, the oscillating frequency and the phase of a portion of the response signal.

In some embodiments, the envelopes of the echoes may have the same or similar shapes. The particular shape of the envelope may result from the electrical characteristics of the sensor node, such as the particular type of sensor and/or the particular type of antenna used in the sensor node. Thus, in some embodiments, obtaining echoes from the response signal may involve identifying portions of the response signal as exhibiting a predefined envelope. This may include identifying portions of the response signal as exhibiting a predefined envelope shape and/or a decay rate that is within a predefined range. The predefined envelope shape and decay rate against which the response signal is compared may be determined as part of a calibration procedure of the sensor node.

The conditioning may be performed in any suitable way. For example, the conditioning may involve segmenting, in the time domain, portions of the response signal and correlating the segmented portions to a reference echo (obtained from a calibration of the sensor node). The duration of the segments may be chosen to match the expected duration of an echo, or the expected duration of an echo plus a certain margin of time. Portions of the response signal that exhibit a correlation above a certain threshold may be deemed to include an echo, portions that exhibit a correlation below the threshold may be deemed to not include an echo. As another example, the conditioning may involve correlating the entirety of the response signal to a reference echo, and identifying which portions of the resulting correlation are above a threshold. In yet another example, the conditioning may involve segmenting portions of the response signal, mixing (e.g., multiplying) the segmented portions with a reference echo, and identifying portions exhibiting a result that is above a threshold.

To improve the transceiver's ability to identify the oscillating frequency of the response signal, in some embodiments, it may be desirable to sum the echoes obtained from the time-domain signal conditioning together. However, summing the echoes together poses a challenge. Because the echoes may have different times of arrivals and/or different phases, simply summing the echoes together may result in a distorted version of an echo, from which it would be difficult to determine the oscillating frequency. In some embodiments, this can be obviated by summing the echoes together in a coherent fashion.

In some embodiments, a coherent summation may involve time delaying the echoes so that the echoes overlap in time, and summing the delayed echoes together. For example, echoes may be delayed based on the timing with which the interrogation pulses are transmitted. In some embodiments, a coherent summation may involve phase shifting the echoes so that the echoes have matching phases, and summing the phase shifted echoes together. For example, echoes may be phase shifted relative to a reference value or may be phase shifted relative to one another. In some embodiments, a coherent summation may involve both time delaying and phase shifting.

Figure 5A:
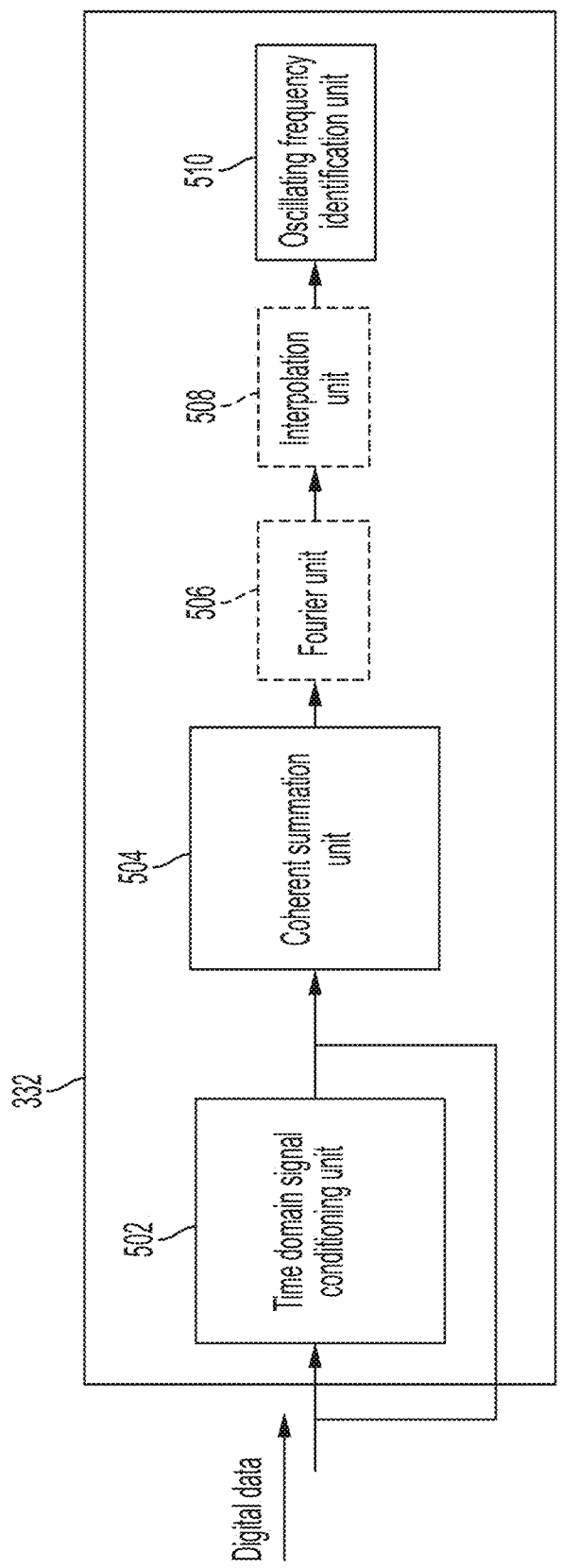
FIG. 5A is a block diagram illustrating an example of the digital circuitry of FIG. 3A, in accordance with some embodiments.

FIG. 5A is a block diagram of an illustrative digital circuit 332 that is configured to obtain echoes from a response signal and to perform coherent summation, in accordance with some embodiments. Digital circuit 332 includes time domain signal conditioning unit 502, coherent summation unit 504, oscillating frequency identification unit 510, and optionally, a Fourier unit 506 and an interpolation unit 508. Time domain signal conditioning unit 502 receives digital data from ADC 330 that represent the demodulated response signal. Using any of the techniques described above, time domain signal conditioning unit 502 determines whether portions of the response signal include echoes. Coherent summation unit 504 receives the digital data from ADC 330 and information from time domain signal conditioning unit 502 indicating whether echoes are present. As a result, coherent summation unit 504 isolates the echoes from spurious pulses and other interfering signals present in the response signal. Further, coherent summation unit 504 sums the echoes together coherently. Optionally, the output of coherent summation unit 504 is Fourier transformed and processed using interpolation unit 508. Oscillating frequency identification unit 510 identifies the oscillating frequency of the echoes, which can be used to determine the environmental or physical condition to which sensor 106 was subject when it produced echo 204.

Figure 5B:
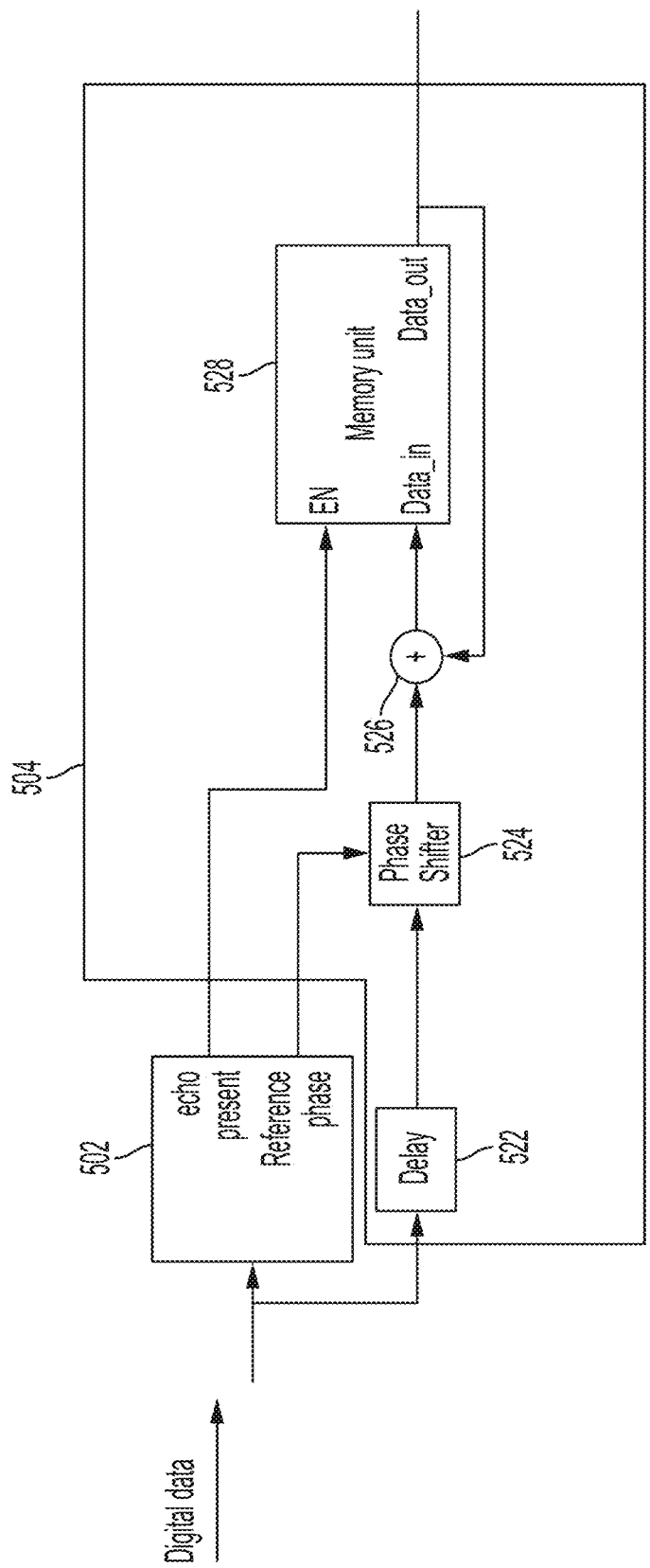
FIG. 5B is a block diagram illustrating an example of the coherent summation unit of FIG. 5A, in accordance with some embodiments.

FIG. 5B shows an illustrative implementation of time domain signal conditioning unit 502 and coherent summation unit 504, in accordance with some embodiments. Coherent summation unit 504 includes a delay unit 522, a phase shifter 524, a digital summer 526 and a memory unit 528. Time domain signal conditioning unit 502 receives digital data representative of a portion of the response signal, and outputs a signal (from the output "echo present") that indicates whether an echo is present in that portion of the response signal. For example, the output "echo present" may be 1 if an echo is present and 0 if no echoes are present, though other logics are also possible. Further, time domain signal conditioning unit 502 produces (from the output "reference phase") information indicating the phase of the echo. Delay unit 522 receives successive portions of the response signal and delays them so that the different portions overlap in time. Phase shifter 524 varies the phase of the response signal portion based on the signal "reference phase." Once phase shifted based on the reference phase, successive response signal portions have matching phases. Digital summer 526 sums the resulting response signal portion with the output of memory unit 528 ("data_out"). The result of the summation is loaded, through the input "data_in," to memory unit 528. In some embodiments, memory unit 528 stores the response signal portion received from "data_in" only if an echo is present. Memory unit 528 may determine whether an echo is present based on the output "echo present," which is provided as input to the enable port ("EN") of memory unit 528. Accordingly, when an echo is present, coherent summation unit 504 sums the present echo to the sum of the previous echoes, thus performing an integration of the echoes. The coherent summation described in connection with FIG. 5B may be considered, at least in some respects, to be a real-time coherent summation. This is because, in some embodiments, each signal portion identified as an echo is summed to the echoes previously accumulated.

The output of coherent summation unit 504, referred to herein as a coherent response signal, may represent an echo of the types received as input to coherent summation unit 504, but with a larger amplitude. The larger amplitude improves the transceiver's ability to determine the frequency of the echo because it improves the overall signal-to-noise ratio.

Figure 6:
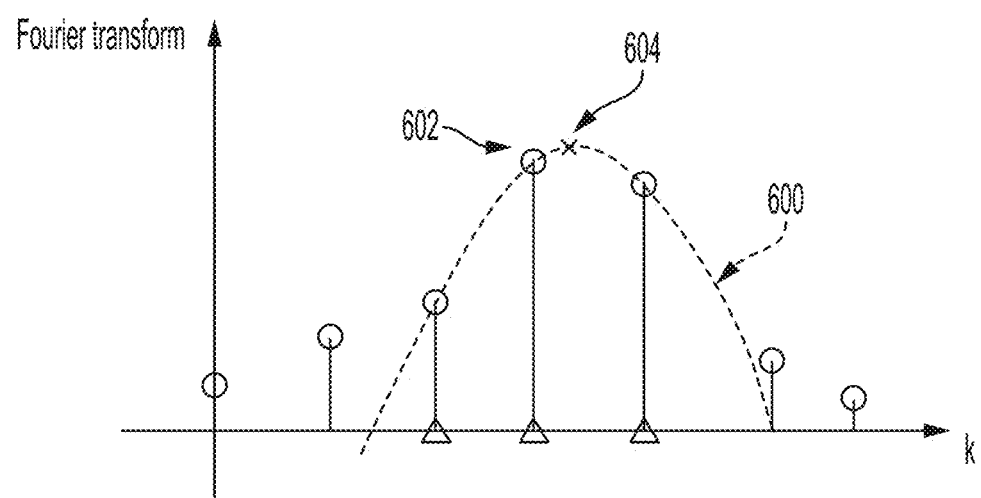
FIG. 6 is a plot illustrating the spectrum of a coherent response signal, in accordance with some embodiments.

In some embodiments, Fourier unit 506 performs a Fourier transform of the coherent response signal. The Fourier transform may be performed, for example, using a discrete Fourier transform (DFT) algorithm or a fast Fourier transform (FFT) algorithm. FIG. 6 is a plot illustrating an example of a Fourier transform. The Fourier transform is plotted as a function of K, a discrete variable representing frequency.

In some embodiments, identifying the oscillating frequency of an echo can be performed by identifying the peak frequency of the Fourier transform. This may be performed using oscillating frequency identification unit 510. In some embodiments, oscillating frequency identification unit 510 identifies the peak frequency by identifying the sample of the Fourier transform having the largest amplitude (sample 602 in this example). Alternatively, oscillating frequency identification unit 510 identifies the peak frequency by interpolating the Fourier transform, and by identifying the peak frequency of the interpolated function. Interpolation unit 508 performs the interpolation. In the example of FIG. 6, interpolation unit 508 performs a quadratic interpolation of the Fourier transform (see function 600). Oscillating frequency identification unit 510 identifies the peak frequency of the interpolated function (see peak 604). It should be appreciated that, instead of relying on a Fourier transform as described above, oscillating frequency identification unit 510 may rely on time domain techniques to identify the oscillating frequency of the echo. In some such embodiments, Fourier unit 506 may be omitted.

The environmental or physical condition to which sensor 106 was subject when it produced echo 204 may be determined based on the determined oscillating frequency.

IV. Interrogation Signals

The environmental or physical condition to be measured with sensor 106 varies over time. Accordingly, the resonant frequency of sensor 106 also varies over time. Applicant has appreciated that interrogating sensor 106 at a frequency that is equal to, or at least near, its resonant frequency would significantly increase the amplitude of the response signal produced by sensor 106. This, in turn, would improve the interrogator's ability to identify the oscillating frequency of the response signal. Unfortunately, the resonant frequency of sensor 106 is not known a priori—this is the quantity that the interrogator seeks to determine. Thus, the interrogator may not know what interrogation frequency would maximize the response amplitude of the sensor.

To determine the interrogation frequency, in some embodiments, the interrogator may perform a frequency sweep—the interrogator transmits several interrogation signals with varying frequencies, and determines which interrogation frequency produces the largest response signal. Once the optimum interrogation frequency has been determined, the interrogator continues to interrogate the sensor at that interrogation frequency. The frequency sweep may be repeated periodically to ensure that the sensor is interrogated at or near its resonant frequency.

In some embodiments, the integration frequency may be swept in order. For example, the interrogator may output frequency $f_1$ at time $t_1$, $f_2$ at $t_2$ and $f_3$ at $t_3$, where $f_1<f_2<f_3$ and $t_1<t_2<t_3$. Applicant has appreciated, however, that sweeping the interrogating frequency in this manner has one major risk—the interrogation process is particularly susceptible to interference. A spurious signal transmitted by a nearby antenna between times $t_1$ and $t_3$, and with a spectrum occupying the entire bandwidth from $f_1$ and $f_3$, would spoil each of these interrogations. Statistically, these spurious can occur relatively frequently, thus posing a challenge to the interrogation process.

Applicant has appreciated that this challenge may be obviated by sweeping the interrogating frequency out-of-order. FIG. 7A illustrates an example of an out-of-order frequency sweep, in accordance with some embodiments. In this example, the interrogator transmits several tones with distinct frequencies in an out-of-order fashion. The interrogator transmits a tone with frequency $f_2$ at time $t_1$, a tone with frequency $f_6$ at time $t_2$, a tone with frequency $f_1$ at time $t_3$, a tone with frequency $f_5$ at time $t_4$, a tone with frequency $f_9$ at time $t_5$, a tone with frequency $f_8$ at time $t_6$, a tone with frequency $f_3$ at time $t_7$, a tone with frequency $f_4$ at time $t_8$ and a tone with frequency $f_7$ at time $t_9$, where $t_i < t_{i+1}$ and $f_i < f_{i+1}$, with $1=1, 2 \ldots 8$.

In this way, a spurious signal transmitted by a nearby antenna between times $t_1$ and $t_3$, and with a spectrum occupying the entire bandwidth from $f_1$ and $f_3$ may spoil some of the interrogations, but likely not all the interrogations. Spurious signals that appear in the order of the interrogation sequence are unlikely, thus statistically reducing the susceptibility of the interrogation process to interference. In some embodiments, the out-of-order frequency sequence may be generated randomly, or pseudo-randomly, thus further reducing the likelihood of being seriously impacted by the presence interference.

FIG. 7B illustrates the amplitude of echoes produced by sensor 106 in response to receiving the corresponding interrogation signals. In this example, interrogating the sensor at frequency $f_4$ produces the largest response, meaning that frequency $f_4$ is the closest, among the interrogation signals, to the resonant frequency of the sensor. Following the sweep, the interrogation may continue to interrogate the sensor at frequency $f_4$, though the sweep of FIG. 7A may be repeated periodically to account for varying conditions.

Figure 8A:
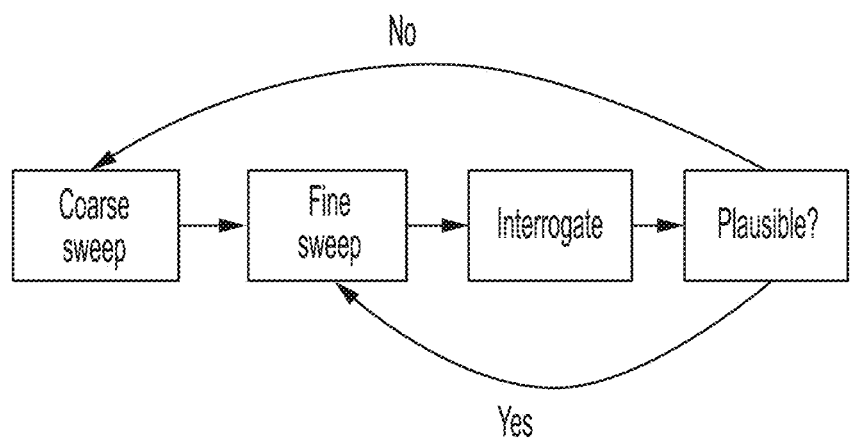
FIG. 8A is a block diagram illustrating an algorithm for identifying the resonant frequency of a sensor, in accordance with some embodiments.
Figure 8B:
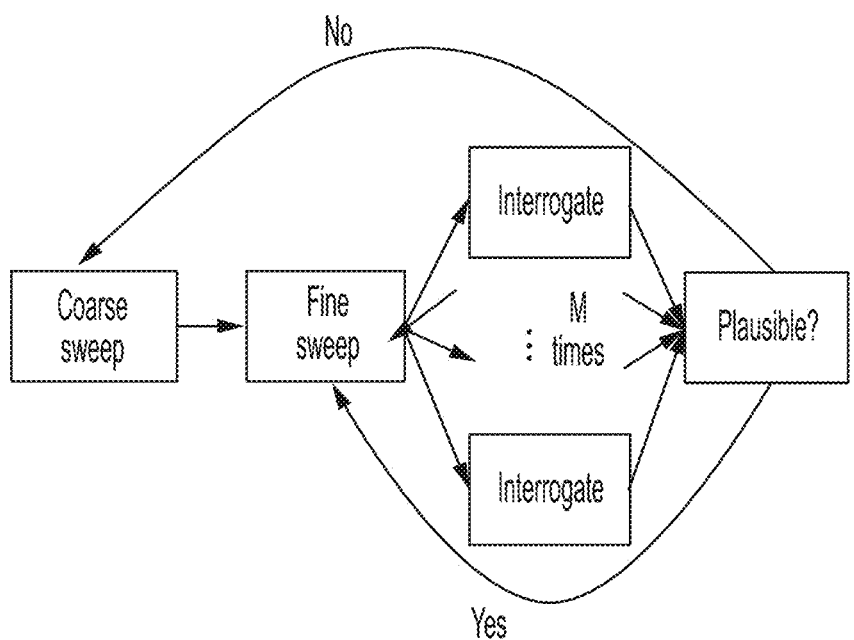
FIG. 8B is a block diagram illustrating another algorithm for identifying the resonant frequency of a sensor, in accordance with some embodiments.

In some embodiments, the amplitude of the response signal may be increased by sweeping the interrogation frequency in two stages. In the first sweeping stage (referred to as the "coarse sweeping stage"), the interrogator identifies the frequency band of the resonant frequency. In the second sweeping stage (referred to as the "fine sweeping stage"), the interrogator further narrows the frequency band of the resonant frequency. FIG. 8A illustrates a two-stage algorithm for identifying the sensor's resonant frequency. The block labeled "coarse sweep" represents the coarse sweeping stage. An example of a coarse sweeping stage is the out-of-order frequency sweeping technique described in connection with FIG. 7A, though other techniques may be used. The block labeled "fine sweep" represents the fine sweeping stage. In this stage, the interrogation frequency may be varied in smaller steps. The frequency may be varied in any suitable fashion, including for example in a linear fashion, in discrete steps. Subsequently, the sensor is interrogated, and the response is averaged over N samples (see block labeled "interrogate"). Further, a Fourier transform of the samples may be computed. The algorithm may proceed in an iterative fashion. At the block labeled "plausible," if the algorithm determines that the result of the Fourier transform is not plausible (for example because the signal-to-noise ratio is too small or is below a first threshold) the algorithm may iterate back to the coarse sweeping stage. Alternatively, the algorithm may iterate back to the fine sweeping stage. The algorithm may end when the signal-to-noise ratio is above a second threshold, greater than the first threshold. In some embodiments, the algorithm of FIG. 8A may be controlled using a proportional-integral-derivative (PID) controller and/or a Kalman filter. FIG. 8B illustrates a similar algorithm, where the sensor is interrogated M times in parallels, for example with M different frequencies.

V. Applications

Figure 9A:
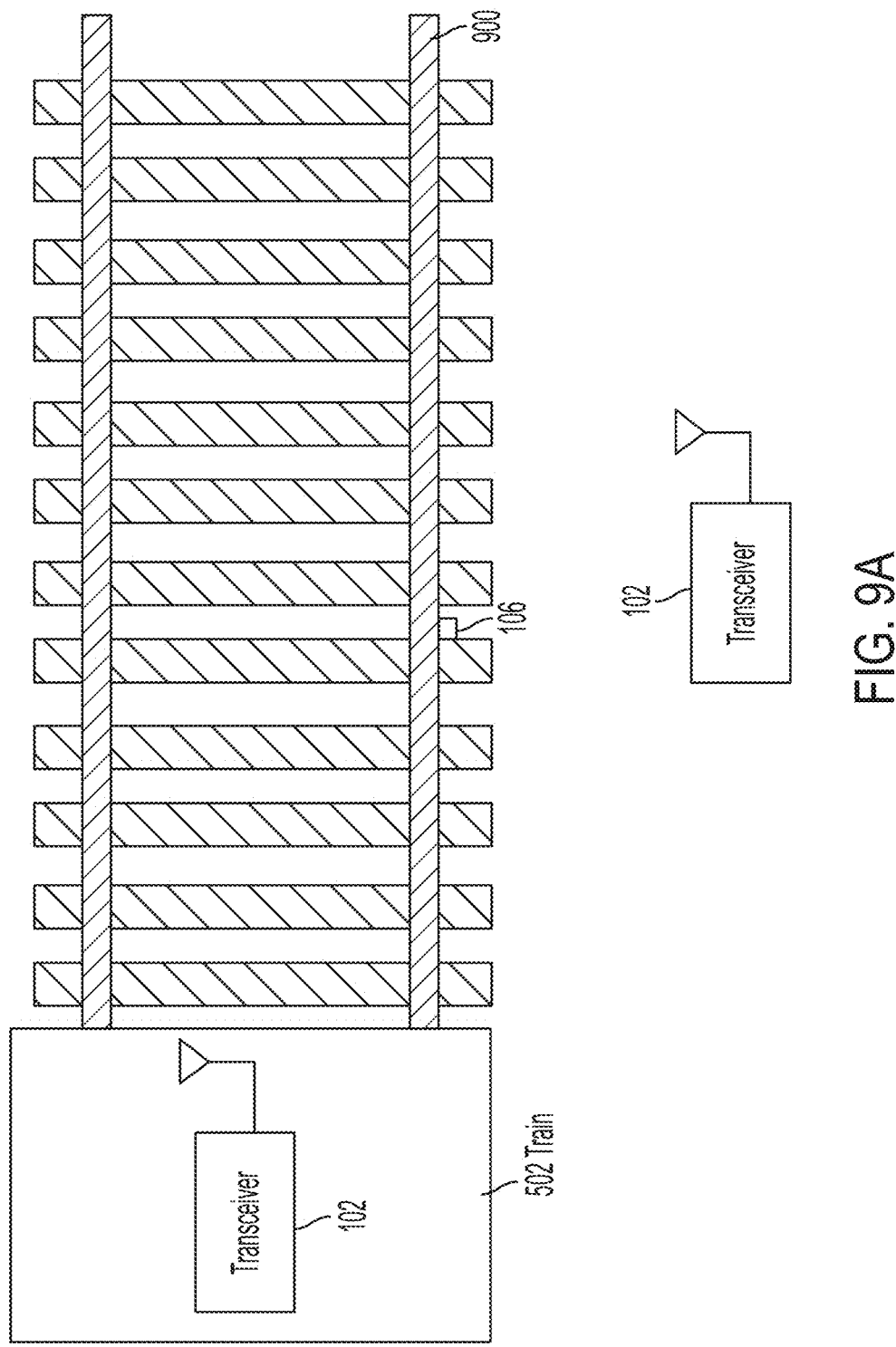
FIG. 9A is a schematic diagram illustrating a sensor for monitoring a characteristic of a railway track, in accordance with some embodiments.
Figure 9B:
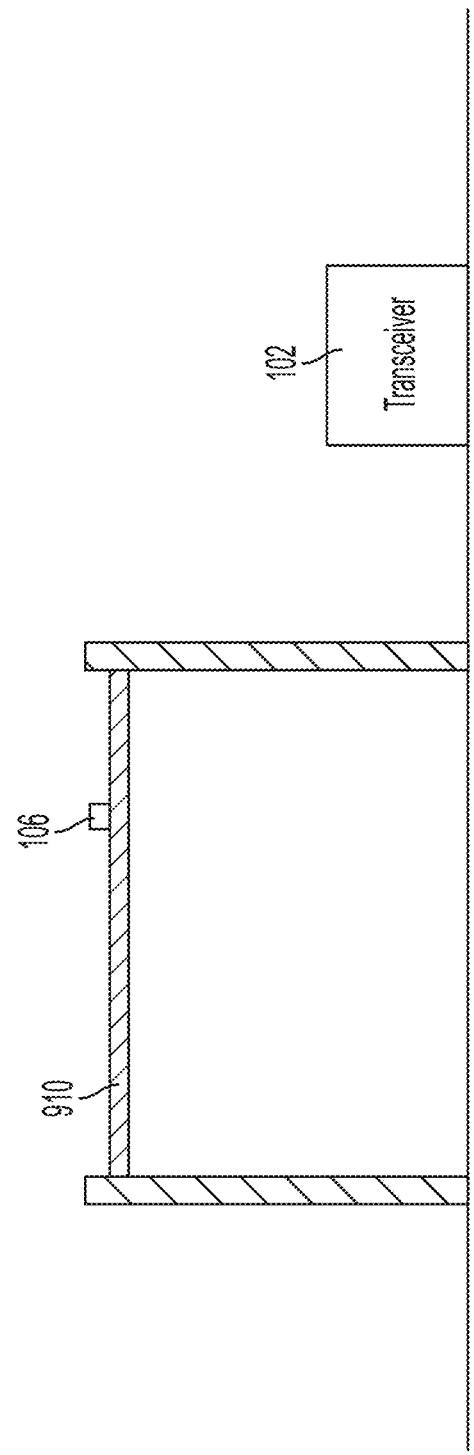
FIG. 9B is a schematic diagram illustrating a sensor for monitoring a characteristic of a busbar, in accordance with some embodiments.

Wireless sensor nodes and interrogators of the types described herein may be used in a variety of settings, including in automotive, industrial and medical applications. One such application is in the context of railway tracks, as illustrated in FIG. 9A. A sensor 106, which may include a temperature sensor and/or a stress sensor, monitors the temperature and/or stress of railway track 500. Signals indicative of the sensed temperature and/or stress are transmitted to one or more transceivers 102, which may disposed near the railway track, on a train 502, or in any other location. When on a train, transceiver 102 may communicate with sensor 106 as the train passes over the temperature sensor. Monitoring the temperature and/or stress of railway tracks may be important in the prevention of train derailments. Railway tracks are generally formed by disposing several discrete track segments in line. The spacing between the end of one track segment and the beginning of the following track segment may be temperature-dependent and may be subject to stress. As the temperature of a track segments increases, due for example to the passage of a train, the track segment expands. As a result, the spacing between contiguous track segments reduces. The cause of some past train derailment has been attributed to such variations in the spacing between adjacent track segments. For this reason, monitoring the temperature and/or stress of a railway track is particular important. Further, because of the high velocity with which trains pass over a particular portion of a railway track, it is important that the temperature and/or stress be sensed in real time or quasi-real time.

Another application is in the context of busbars, as illustrated in FIG. 5B. Busbars 510 include metallic strips or bars for local high current power distribution. Busbars 510 are generally uninsulated, and are supported in air by insulated pillars 512. Currents flowing through a busbar increase the temperature of the busbar. Over time, these temperature increases may damage the busbar, thus decreasing its lifetime. A sensor 106, which may be include the temperature sensor, monitors the temperature of busbar 510. Signals indicative of the sensed temperature are transmitted to transceiver 102.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately," "substantially," and "about" may include the target value.

What is claimed is:

1. A method for controlling a sensor node, the method comprising:
   transmitting at least one interrogation signal to the sensor node;
   receiving, in response to the transmitting, a response signal from the sensor node;
   conditioning the response signal to obtain a plurality of echoes including a first echo and a second echo, wherein the conditioning comprises isolating the plurality of echoes from spurious signals by identifying respective envelopes of a plurality of portions of the response signal;
   and summing the plurality of echoes together coherently to obtain a coherent response signal, wherein summing the plurality of echoes together coherently comprises:
      delaying the first echo with a delay unit and phase shifting the first echo with a phase shifter;
      storing the delayed first echo in a memory;
      determining a phase associated with the second echo;
      delaying the second echo with the delay unit;
      controlling, using a conditioning unit, the phase shifter based on the determined phase associated with the second echo to phase match the second echo with the first echo; and summing the phase matched second echo to the stored first echo.

2. The method of claim 1, wherein transmitting the at least one interrogation signal to the sensor node comprises transmitting a plurality of frequency tones having distinct frequencies out-of-order.

3. The method of claim 2, wherein transmitting the plurality of frequency tones out-of-order comprises transmitting the plurality of frequency tones according to a random time sequence.

4. The method of claim 2, wherein:
receiving the response signal comprises receiving a plurality of response frequency tones from the sensor node, and
transmitting the at least one interrogation signal to the sensor node comprises, subsequent to receiving the plurality of response frequency tones:
determining an interrogation frequency tone based on the plurality of response frequency tones; and
transmitting the interrogation frequency tone to the sensor node.

5. The method of claim 1, further comprising determining an environmental or physical condition using the coherent response signal.

6. The method of claim 5, wherein determining the environmental or physical condition using the coherent response signal comprises determining at least one selected from the group consisting of:
an oscillating frequency of the coherent response signal,
an amplitude of the coherent response signal, and
an envelope of the coherent response signal.

7. The method of claim 5, wherein determining the environmental or physical condition using the coherent response signal comprises determining a temperature using the coherent response signal.

8. An interrogator wirelessly coupled with a sensor node, the interrogator comprising:
a transmitter configured to transmit at least one interrogation signal to the sensor node; and
a receiver configured to:
receive, in response to the transmitting, a response signal from the sensor node;
condition the response signal to obtain a plurality of echoes including a first echo and a second echo, wherein the conditioning comprises isolating the plurality of echoes from spurious signals by identifying respective envelopes of a plurality of portions of the response signal;
and sum the plurality of echoes together coherently to obtain a coherent response signal by
delaying the first echo with a delay unit and phase shifting the first echo with a phase shifter,
storing the delayed first echo in a memory,
determining a phase associated with the second echo,
delaying the second echo with the delay unit,
controlling, using a conditioning unit, the phase shifter on the determined phase associated with the second echo to phase match the second echo with the first echo, and
summing the phase matched second echo to the stored first echo.

9. The interrogator of claim 8, wherein the receiver is further configured to determine an environmental or physical condition using the coherent response signal.

10. The interrogator of claim 9, wherein the receiver is configured to determine the environmental or physical condition using the coherent response signal by determining at least one selected from the group consisting of:
an oscillating frequency of the coherent response signal,
an amplitude of the coherent response signal, and
an envelope of the coherent response signal.

11. The interrogator of claim 9, wherein determining the environmental or physical condition using the coherent response signal comprises determining a temperature using the coherent response signal.

12. The interrogator of claim 8, wherein the transmitter is configured to transmit the at least one interrogation signal to the sensor node by transmitting a plurality of frequency tones having distinct frequencies out-of-order.

13. The interrogator of claim 12, wherein transmitting the plurality of frequency tones out-of-order comprises transmitting the plurality of frequency tones according to a random time sequence.

14. The interrogator of claim 12, wherein:
the receiver is further configured to receive the response signal comprises receiving a plurality of response frequency tones from the sensor node, and
the transmitter is further configured to transmit the at least one interrogation signal to the sensor node comprises, subsequent to receiving the plurality of response frequency tones:
determining an interrogation frequency tone based on the plurality of response frequency tones; and
transmitting the interrogation frequency tone to the sensor node.

15. An interrogator wirelessly coupled with a sensor node, the interrogator comprising:
an antenna;
a transmitter coupled to the antenna and comprising:
a local oscillator; and
transmit circuitry configured to transmit, through the antenna, at least one interrogation signal based on an output of the local oscillator;
a receiver coupled to the antenna and configured to:
receive, subsequent to the transmitting, a response signal from the sensor node;
condition the response signal to obtain a plurality of echoes, including a first and a second echo, wherein the conditioning comprising isolating the plurality of echoes from spurious signals by identifying respective envelopes of a plurality of portions of the response signal;
sum the plurality of echoes together coherently to obtain a coherent response signal by:
delaying the first echo with a delay unit and phase shifting the first echo with storing the delayed first echo in a memory, a phase shifter,
determining a phase associated with the second echo,
delaying the second echo with the delay unit,
controlling, using, a conditioning unit, the phase shifter based on the determined phase associated with the second echo to phase match the second echo with the first echo, and
summing the phase matched second echo to the stored first echo; and
determine an environmental or physical condition using the coherent response signal.

16. The interrogator of claim 15, wherein the transmit circuitry is configured to transmit the at least one interrogation signal to the sensor node by transmitting a plurality of frequency tones having distinct frequencies out-of-order.

17. The interrogator of claim 16, wherein:
the receiver is further configured to receive the response signal comprises receiving a plurality of response frequency tones from the sensor node, and
the transmit circuitry is further configured to transmit the at least one interrogation signal to the sensor node comprises, subsequent to receiving the plurality of response frequency tones:
  determining an interrogation frequency tone based on the plurality of response frequency tones; and
  transmitting the interrogation frequency tone to the sensor node.

18. The interrogator of claim 15, wherein determining the environmental or physical condition using the coherent response signal comprises determining at least one selected from the group consisting of:
an oscillating frequency of the coherent response signal,
an amplitude of the coherent response signal, and
an envelope of the coherent response signal.

19. The interrogator of claim 15, wherein determining the environmental or physical condition using the coherent response signal comprises determining a temperature using the coherent response signal.

\* \* \* \* \*

UNITED STATES PATENT AND TRADEMARK OFFICE
CERTIFICATE OF CORRECTION

| | | |
|---|---|---|
| PATENT NO. | : 11,805,396 B2 | Page 1 of 1 |
| APPLICATION NO. | : 16/831741 | |
| DATED | : October 31, 2023 | |
| INVENTOR(S) | : Eugene Oh Hwang et al. | |

It is certified that error appears in the above-identified patent and that said Letters Patent is hereby corrected as shown below:

In the Claims

Column 14, Claim 15, Lines 52-53, should read:
shifting the first echo with a phase shifter,
storing the delayed first echo in a memory, Signed and Sealed this
Seventh Day of May, 2024

*Katherine Kelly Vidal*

Katherine Kelly Vidal
*Director of the United States Patent and Trademark Office*